(12) United States Patent
Vasyltsov

(10) Patent No.: US 8,379,842 B2
(45) Date of Patent: Feb. 19, 2013

(54) CRYPTOGRAPHIC METHODS INCLUDING MONTGOMERY POWER LADDER ALGORITHMS

(75) Inventor: Ihor Vasyltsov, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 908 days.

(21) Appl. No.: 11/712,942

(22) Filed: Mar. 2, 2007

(65) Prior Publication Data

US 2008/0049931 A1    Feb. 28, 2008

(30) Foreign Application Priority Data

Mar. 4, 2006   (KR) .................. 10-2006-0020720

(51) Int. Cl.
 *H04K 1/00*   (2006.01)
(52) U.S. Cl. ................ 380/28; 380/2; 380/30; 380/255
(58) Field of Classification Search ............... 380/2, 28, 380/30, 255
See application file for complete search history.

(56) References Cited

U.S. PATENT DOCUMENTS

| | | | | |
|---|---|---|---|---|
| 6,738,478 | B1* | 5/2004 | Vanstone et al. ............... | 380/28 |
| 7,046,801 | B2* | 5/2006 | Okeya ............................ | 380/28 |
| 7,308,096 | B2* | 12/2007 | Okeya et al. .................. | 380/28 |
| 7,506,165 | B2* | 3/2009 | Kocher et al. ................. | 713/194 |
| 7,602,907 | B2* | 10/2009 | Zhu et al. ....................... | 380/30 |
| 7,714,735 | B2* | 5/2010 | Rockwell ....................... | 340/635 |
| 7,787,620 | B2* | 8/2010 | Kocher et al. ................. | 380/29 |
| 2002/0124179 | A1* | 9/2002 | Kaminaga et al. ............ | 713/194 |
| 2002/0174155 | A1* | 11/2002 | Hars et al. ..................... | 708/491 |
| 2002/0178371 | A1* | 11/2002 | Kaminaga et al. ............ | 713/189 |
| 2003/0028771 | A1* | 2/2003 | Kocher et al. ................. | 713/172 |
| 2003/0123656 | A1* | 7/2003 | Izu et al. ........................ | 380/30 |
| 2004/0083251 | A1* | 4/2004 | Geiringer et al. ............. | 708/492 |
| 2004/0114756 | A1* | 6/2004 | Moller et al. .................. | 380/30 |
| 2004/0114760 | A1* | 6/2004 | Brown et al. .................. | 380/255 |
| 2004/0223619 | A1* | 11/2004 | Jablon ............................ | 380/277 |
| 2004/0247115 | A1 | 12/2004 | Ono et al. | |

(Continued)

FOREIGN PATENT DOCUMENTS

JP   2003-255831   9/2003

OTHER PUBLICATIONS

"Elliptic Curve Cryptosystems in the Presence of Permanent and Transient Faults" by Mathieu Ciet and Marc Hoye, 2005.*

(Continued)

*Primary Examiner* — Jeffrey D Popham
*Assistant Examiner* — Gary Gracia
(74) *Attorney, Agent, or Firm* — Harness, Dickey & Pierce, P.L.C.

(57) ABSTRACT

A cryptographic method for a cryptographic system may include receiving a basic point on an elliptic curve and a scalar k; initializing primary variables with the basic point; iterating through a plurality of operations using a repetitive operation variable; identifying a fault, in one or more of setting secondary variables corresponding to the primary variables, resetting the primary and secondary variables, and calculating a scalar product in a multiplier of the cryptographic system, the identifying of the fault using the primary and secondary variables based on a portion of the scalar k, the fault identified by one of determining that values of at least two of the secondary variables are different and determining that at least one of the secondary variables is different from at least one of the primary variables; and outputting the scalar product if there is no fault identified.

16 Claims, 6 Drawing Sheets

U.S. PATENT DOCUMENTS

| | | | | |
|---|---|---|---|---|
| 2004/0250081 | A1* | 12/2004 | Crandall | 713/176 |
| 2005/0152541 | A1* | 7/2005 | Takenaka et al. | 380/28 |
| 2005/0169462 | A1* | 8/2005 | Jung et al. | 380/28 |
| 2005/0243619 | A1* | 11/2005 | Brown et al. | 365/202 |
| 2006/0093137 | A1* | 5/2006 | Izu et al. | 380/30 |
| 2006/0280296 | A1* | 12/2006 | Vasyltsov et al. | 380/28 |
| 2007/0064931 | A1* | 3/2007 | Zhu et al. | 380/30 |
| 2007/0150530 | A1* | 6/2007 | Mevergnies et al. | 708/7 |
| 2007/0177721 | A1* | 8/2007 | Itoh et al. | 380/28 |
| 2008/0025498 | A1* | 1/2008 | Vasyltsov | 380/28 |
| 2008/0031443 | A1* | 2/2008 | Vasyltsov et al. | 380/2 |
| 2008/0031444 | A1* | 2/2008 | Vasyltsov | 380/2 |
| 2008/0175376 | A1* | 7/2008 | Campagna et al. | 380/30 |

OTHER PUBLICATIONS

Kaliski et al., "The Montgomery Powering Ladder" Cryptographic Hardware and Embedded Systems—CHES 2002, vol. 2523, pp. 291-302, 2003.

* cited by examiner

CRYPTOGRAPHIC METHODS INCLUDING MONTGOMERY POWER LADDER ALGORITHMS

PRIORITY STATEMENT

This application claims priority under 35 U.S.C. §119 to Korean Patent Application No. 10-2006-0020720, filed on Mar. 4, 2006, in the Korean Intellectual Property Office (KIPO), the entire disclosure of which is incorporated herein by reference.

BACKGROUND

Example embodiments relate to cryptographic methods, for example, example embodiments generally relate to cryptographic methods of countering differential fault analysis (DFA) using elliptic curve cryptography (ECC) fast Montgomery power ladder algorithms (MPLA).

THE CONVENTIONAL ART

With the introduction of large amounts of information in society, protection of information using cryptographic algorithms and cryptographic protocols has been increasingly important. Among cryptographic algorithms used to protect information, open key cryptographic algorithms, which are used in Rivest-Shamir-Adlem (RSA) cryptographic systems and elliptic curve cryptography (ECC), have been rapidly applied to a variety of fields, for example, the Internet and financial networking. Open key cryptographic systems solve key distribution problems and electronic signature issues that are drawbacks of secret key cryptographic algorithms.

For example, if an attacker wishes to intrude an RSA open key cryptographic system and an ECC open key cryptographic system, the attacker may perform a side channel analysis (SCA). Among the types of SCA, known methods may include timing analysis, power analysis, electromagnetic analysis, and fault analysis. SCA may be an effective attacking method if the hardware of a targeted cryptographic system is known specifically to the attacker.

Among fault analyses, a known method may be differential fault analysis (DFA). In DFA, a secret key of a cryptographic system is found using difference values of calculated variable (s). In DFA, a fault may be inserted in a cryptographic system, and by analyzing the result corresponding to the inserted fault, a secret key of the cryptographic system may be identified.

A value stored, or to be stored, in a register may be changed by a fault. Because a cryptographic system may refer to a value stored in a register if a predetermined or desired operation is performed, an error corresponding to a value changed by the fault may be included in the result of the operation.

A cryptographic analyzer interprets the output operation result accompanied by the error(s), and may therefore obtain the secret key and other information.

A variety of methods which may be used in ECC to counter DFA have been suggested.

FIG. 1 is a flowchart illustrating a calculate-twice-and-check (CT&C) method of countering DFA according to conventional technology.

In the CT&C method 100, first, an arbitrary point P on an elliptic curve is selected in operation S101, and then, by multiplying P by an arbitrary integer k, a first comparison value Q1 is obtained in operation S103. Additionally, by multiplying P by arbitrary integer k, a second comparison value Q2 is obtained in operation S105.

The magnitudes of the first comparison value Q1 and the second comparison value Q2 are compared in operation S107. If the first comparison value Q1 and the second comparison value Q1 are identical, no fault has flowed in the multiplication operations, and one of the first comparison value Q1 and the second comparison value Q2 is output as the operation result Q in operation S109. If the first comparison value Q1 and the second comparison value Q2 are not identical, a fault has flowed in the multiplication operations, and instead of the operation result Q, a warning signal is output in operation S111.

Here, it is assumed that all faults flow randomly, and a probability that faults having identical values are flowing at the same time in two multiplication operations is negligible. Also, the arbitrary integer k is a secret key, and the first comparison value Q1 and the second comparison value Q2 are calculated generally at the same time.

The CT&C method illustrated in FIG. 1 has an advantage in that the method may be applied to many types of cryptographic algorithms, symmetric, asymmetric, and stream types. However, the CT&C method has a disadvantage in that an identical multiplication is performed twice every time. Furthermore, because a fault component always exists in each usage area of most of smart cards and mobile devices, the CT&C method may not be applied to smart cards or mobile devices without alteration.

FIG. 2 is a flowchart illustrating a check-the-output-point (COP) method of countering DFA according to the conventional art.

In the COP method 200, first an arbitrary point P on an elliptic curve is selected in operation S201, and by multiplying P with a predetermined or desired integer k, a comparison value Q1 is obtained in operation S203.

Subsequently, it is determined whether or not the comparison value Q1 is one point on an elliptic curve E in operation S205. If the comparison value Q1 is one point on the elliptic curve E, no fault has flowed in the multiplication operation and the comparison value Q1 is output in operation S209. If the comparison value Q1 is not one point on the elliptic curve E, a fault has flowed in the multiplication operation, and a warning signal (instead of the comparison value Q1) is output in operation S211.

It may be assumed that all faults flow in randomly, and that the probability of the comparison value Q1 being calculated after a fault is inserted in the point of the elliptic curve E is negligible. Also, the predetermined or desired value k is generally a secret key.

The COP method 200 has the advantage of countering DFA without degrading the performance of a cryptographic system. However, because the COP method 200 may only be applied to cryptographic systems based on ECC, the application range is limited. Additionally, if the method is used to counter an attack using a fault with a changing sign, the performance of the cryptographic system may be lowered.

SUMMARY

Example embodiments may provide cryptographic methods countering a different fault analysis (DFA) using an elliptic curve cryptography (ECC) fast Montgomery power ladder algorithm (MPLA).

Example embodiments may provide cryptographic techniques capable of being applied to a variety of cryptographic systems without degrading the performance of the cryptographic systems, and countering a variety of attacks using faults.

According to an example embodiment, a cryptographic method may include receiving a basic point P on an elliptic curve and a scalar k, initializing a plurality of primary variables ($P_1$ and $P_2$) with the basic point P, iterating through a plurality of operations using a repetitive operation variable i, where i is an integer. The plurality of operations may include setting a plurality of secondary variables ($T_1$ and $T_2$) corresponding to the plurality of primary variables ($P_1$ and $P_2$), resetting the plurality of primary variables ($P_1$ and $P_2$) and secondary variables ($T_1$ and $T_2$) based on a portion of the scalar k, and calculating a scalar product Q equal to the product of the basic point P and the scalar k. The method may further include identifying a fault using the plurality of primary variables ($P_1$ and $P_2$) and secondary variables ($T_1$ and $T_2$) based on a portion of the scalar k, and outputting the scalar product Q if there is no fault identified. The cryptographic method may be applied to a variety cryptographic systems without degrading the performance of the cryptographic systems, and may counter a variety of attacks using faults and/or fault analysis.

According to an example embodiment, a cryptographic method may include receiving a basic point P on an elliptic curve and a scalar k, and initializing a plurality of primary variables by using the basic point P. The method may further include setting a plurality of secondary variables corresponding to the plurality of primary variables (P1, P2) and then, by performing repetitive operations of the plurality of primary variables and secondary variables in response to the scalar k, calculating a scalar product Q that is the product of the basic point P and the scalar k. The method may also include checking whether or not a fault has flowed in by using the plurality of primary variables and secondary variables in response to the scalar k, and if there is no inflow of a fault, outputting the scalar product Q.

In the initializing of the plurality of primary variables, first primary variable $P_1$ may be initialized as the basic point P, and second primary variable $P_2$ may be initialized as twice the basic point P, and repetitive operation variable i (i is an integer) may be set as initial value t−1 (t is an integer), and the scalar k may be expressed by a binary bit $(k_{t-1}, \ldots, k_1, k_0)_2$, and $k_{t-1}$ is 1.

The calculating of the scalar product Q may include setting first second variable $T_1$ as the first primary variable $P_1$, and second variable $T_2$ as the second primary variable $P_2$, and by decreasing the repetitive operation variable i until the repetitive operation variable i is less than 0, resetting the first primary variable $P_1$ and the second primary variable $P_2$ with predetermined or desired values, in response to the binary bit $k_i$.

In resetting of the first primary variable $P_1$ and the second primary variable $P_2$ with predetermined or desired values, if the binary bit $k_i$ is 1, the second primary variable $P_2$ may be reset as a value obtained by doubling the second primary variable $P_2$, and the first primary variable $P_1$ may be reset as the sum of the first primary variable $P_1$ and the second secondary variable $T_2$. If the binary bit $k_i$ is not 1, the first primary variable $P_1$ may be reset as a value obtained by doubling the first primary variable $P_1$ and the second secondary variable $P_2$ may be reset as the sum of the first secondary variable $T_1$ and the second primary variable $P_2$.

The checking of whether or not a fault has flowed in may be performed whenever resetting of the first primary variable $P_1$ and the second primary variable $P_2$ is repeated, or after the repetitive resetting operations are finished, or in an arbitrary resetting operation while the repetitive resetting operations are performed.

In the initializing of the plurality of primary variables ($P_1$, $P_2$), a check rate (RATE) may further be set, and calculating the scalar product Q may further include receiving a randomly generated check value (CHECK), and if the check value (CHECK) is equal to or less than the check rate (RATE), in the resetting of the first primary variable $P_1$ and the second primary variable $P_2$ with predetermined or desired values, whether or not a fault has flowed in may be checked.

The checking of whether or not a fault has flowed in may include, if the binary bit $k_i$ is 1, resetting the first secondary variable $T_1$ as a value obtained by doubling the first secondary variable $T_1$, and resetting the first secondary $T_1$ as the sum of the first primary variable $P_1$ determined in response to the first secondary variable $T_1$ and the basic point $P_1$. If the second primary variable $P_2$ and the reset first secondary variable $T_1$ are identical, determining that no fault has flowed in, and if the variables $P_2$ and $T_1$ are not identical, determining that a fault has flowed in. If the binary bit $k_i$ is not 1, resetting the second secondary variable $T_2$ as a value obtained by doubling the second secondary variable $T_2$ and resetting the first secondary variable $T_1$ as the sum of the second primary variable $P_2$ determined in response to the first secondary variable $T_1$ and the basic point P, and if the reset second secondary variable $T_2$ and the reset first secondary variable $T_1$ are identical, determining that no fault has flowed in, and if the variables $T_2$ and $T_1$ are not identical, determining that a fault has flowed in.

If it is determined that a fault has flowed in, the method may further include outputting an alarm signal.

The outputting of the alarm signal may include at least one or more of stopping an operation related to the cryptographic method and resetting predetermined or desired registers in which the operation is executed, diffusing a fault in relation to the scalar k, and modifying the scalar product Q.

BRIEF DESCRIPTION OF THE DRAWINGS

Example embodiments will become more apparent by describing them in detail with reference to the attached drawings in which.

DETAILED DESCRIPTION OF EXAMPLE EMBODIMENTS

Figure 1:
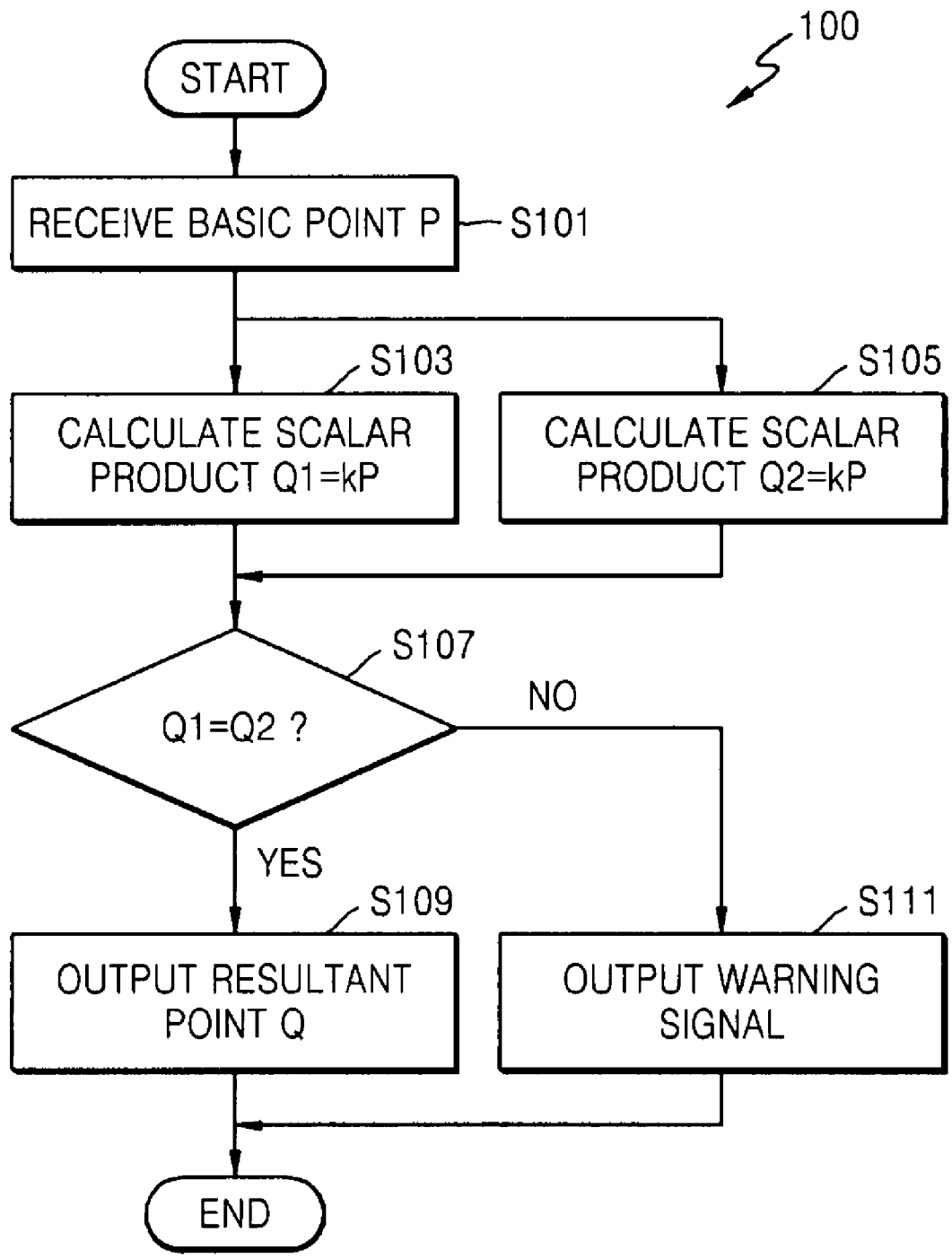
FIG. 1 is a flowchart illustrating a calculate-twice-and-check (CT&C) method of countering a differential fault analysis (DFA) according to the conventional art.
Figure 2:
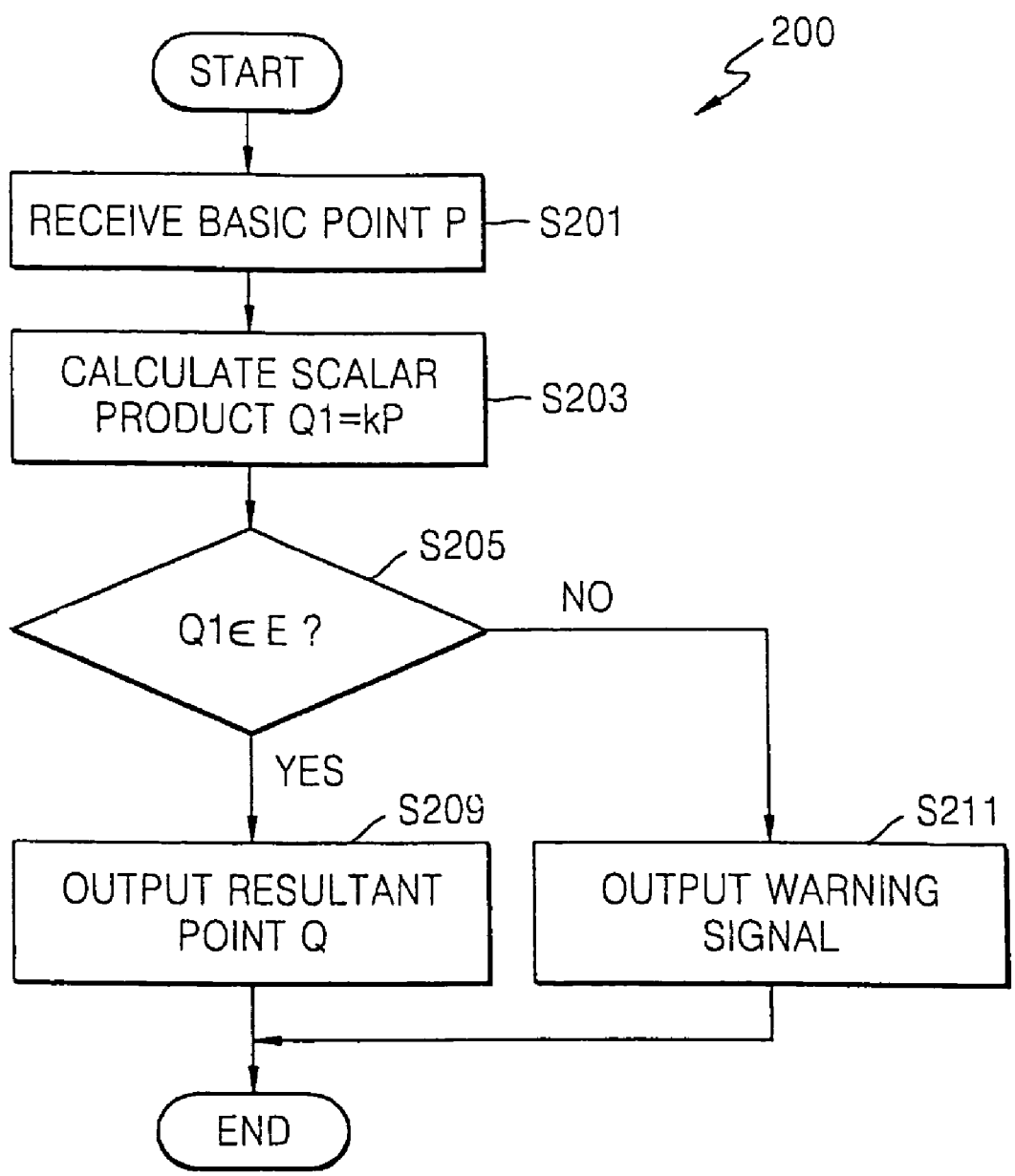
FIG. 2 is a flowchart illustrating a check-the-output-point (COP) method of countering a DFA according to the conventional art.

The attached drawings for illustrating example embodiments are referred to in order to gain sufficient understanding of the merits thereof, and the objectives accomplished by implementation of example embodiments.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various operations or calculations, these operations or calculations should not be limited by these terms. These terms are only used to distinguish one operation or calculation from another. For example, a first calculation could be termed a second calculation, and, similarly, a second operation could be termed a first operation, without departing from the scope of this disclosure. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, operations, operations, elements, and/or components, but do not preclude the presence or addition of one or more other features, integers, operations, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments will be described in detail by explaining the attached drawings.

In elliptic curve cryptography (ECC), an arbitrary elliptic curve E and a point P on the elliptic curve E may be selected as system parameters. A user 1 who wants cryptographic communication may randomly generate an integer d. By multiplying d and P, the user 1 may generate a key Q (e.g., Q=d*P). User 1 may open Q as an open key, and may safely store d as a secret key (e.g., user 1's key).

A user 2 who wants to secretly transmit message M to user 1 may randomly generate integer k. By multiplying P (which is one of the system parameters) by integer k, user 2 may generate cryptographic message A (e.g., A=k*P). By using the open key Q provided by user 1 and the message M desired to be transmitted, the cryptographic message B may be generated (e.g., B=M+kQ). Subsequently, user 2 may transmit the final results, cryptographic messages A and B, to user 1.

User 1 may receive cryptographic messages A and B transmitted by user 2. User A may calculate dA by using user A's secret key d, and subsequently, may restore message M using the following equation 1:

$$M = B - dA \qquad \text{(equation 1)}$$

Referring to equation 1, it can be seen that the most important operations in the ECC open key cryptographic system are addition and scalar multiplication.

An arbitrary point (x,y) on an elliptic curve E satisfies the following equation 2:

$$E: y^2 + a_1 xy + a_3 y = x^3 + a_2 x^2 + a_4 x + a_6 \qquad \text{(equation 2)}$$

In the cryptographic application field, the characteristic of equation 2 may be used in operation of a prime finite field GF(p) or a binary finite field GF($2^n$). The prime finite field is a field in which the number of elements is limited to a prime number p, and there can exist only one prime finite field GF(p) in which the number of elements is p.

In order to obtain a variable R(P+Q)=(x3,y3) in the prime finite field (e.g., adding two different variables P=(x1,y1) and Q=(x2,y2)), the following equation 3 may be performed:

$$P \ne Q \Rightarrow \begin{cases} \theta = \dfrac{y_2 - y_1}{x_2 - x_1}; \\ x_3 = \theta^2 - x_1 - x_2; \\ y_3 = \theta(x_1 - x_3) - y_1; \end{cases} \qquad \text{(equation 3)}$$

In the prime finite field GF(p), if two variables P and Q are identical, variable R may be obtained by performing the following equation 4:

$$P = Q \Rightarrow \begin{cases} \theta = \dfrac{3x^2 + a}{2y}; \\ x_3 = \theta^2 - 2x; \\ y_3 = \theta(x - x_3) - y; \end{cases} \qquad \text{(equation 4)}$$

Here, because it may be assumed that two variables P and Q are identical, x1 and x2 are expressed as x. Likewise, y1 and y2 are expressed as y.

However, in the binary finite field GF($2^n$), in order to obtain a variable R(P+Q)=(x3,y3) (e.g., adding the two different variables P=(x1,y1) and Q=(x2,y2)), the following equation 5 may be performed:

$$P \ne Q \Rightarrow \begin{cases} \theta = \dfrac{y_2 + y_1}{x_2 + x_1}; \\ x_3 = \theta^2 + \theta + x_1 + x_2 + a; \\ y_3 = \theta(x_1 + x_3) + x_3 + y_1; \end{cases} \qquad \text{(equation 5)}$$

In the binary finite field GF($2^n$), if the two variables P and Q are identical, variable R may be obtained by performing the following equation 6:

$$P = Q \Rightarrow \begin{cases} \theta = x + \dfrac{y}{x}; \\ x_3 = \theta^2 + \theta + a; \\ y_3 = \theta(x + x_3) + x_3 + y; \end{cases} \qquad \text{(equation 6)}$$

As illustrated in equations 3 through 6, it may be seen that scalar multiplication to obtain Q=k·P by multiplying an arbitrary point P on an elliptic curve E by an arbitrary constant k, is also an important calculation performed in ECC together with addition operations. Here, the constant k may generally be a secret key and Q may be obtained by multiplying P by k.

To obtain k by using Q and P values, a discrete logarithm operation may be performed. The discrete logarithm operation may be performed by applying the characteristic of an elliptic curve to finite fields, and underlies the secrecy of the cryptographic protocol.

Scalar multiplication operations may also be based on a point operation (e.g., a finite field operation). As methods of performing scalar multiplication operations, there are binary methods, beta-ry methods, sliding window methods, and Montgomery power ladder algorithms (MPLA). Among them, MPLA may be widely used.

MPLA was devised originally to counter a simple power analysis attack. However, MPLA has become a universal algorithm that is applied to modular exponential operations used in an RSA system, as well as scalar multiplication operations performed in fields of ECC.

Hereinafter, example embodiments will be explained generally considering a scalar multiplication operation using MPLA in ECC. However, a person having ordinary skill in the art of example embodiments understands that the embodiments disclosed may be applied to modular exponential operations through modification.

In an ordinary MPLA, first, two variables are defined as the following equation 7:

$$L_j = \sum_{i=j}^{t-1} k_i 2^{i-j} \quad \text{(equation 7)}$$

$$H_j = L_j + 1$$

In equation 7, arbitrary integer k may be expressed by a plurality of binary bits $(k_{t-1}, \ldots, k_1, k_0)$, $k_i$ corresponds to one of the plurality of binary bits with respect to the value of variable i, and $k_{t-1}$ always has a value of 1. The relationship between the two variables expressed in equation 7 may be rearranged as the following equation 8:

$$L_j = 2L_{j+1} + k_j = L_{j+1} + H_{j+1} + k_j - 1 = 2H_{j+1} + k_j - 2 \quad \text{(equation 8)}$$

By using the relationship between the two variables expressed in equation 8 and the value of a binary bit $k_j$ with respect to the value of variable j, another mathematical expression of the relationship between two variables may be arranged as the following equation 9:

$$(L_j, H_j) = \begin{cases} (2L_{j+1}, L_{j+1} + H_{j+1}) & \text{if } k_j = 0, \\ (L_{j+1} + H_{j+1}, 2H_{j+1}) & \text{if } k_j = 1. \end{cases} \quad \text{(equation 9)}$$

By using equations 3 through 9, a general MPLA to obtain the result Q (e.g., Q=kP) of a scalar multiplication operation may be expressed as the following algorithm (Algorithm 1):

---
Algorithm (1) General MPLA
---
Input : k = $(k_{t-1},\ldots,k_1,k_0)_2$ with $k_{t-1}$ = 1, P(x,y)
Output : kP($x_3,y_3$)
1. $P_1 \leftarrow P$
2. $P_0 \leftarrow 2P$
3. for i = n − 2 to 0 , do
    3.1 if $k_j$ = 1 then
        $P_1 \leftarrow P_1 + P_0$; $P_0 \leftarrow 2P_0$
    3.2 else
        $P_0 \leftarrow P_1 + P_0$; $P_1 \leftarrow 2P_1$
end for;
4. return kP($x_3,y_3$)

---

Variable i begins at t−2 in operation 3 because a case where variable i is t−1 is already considered in operations 1 and 2. An addition operation ($P_1+P_0$) may be executed by performing equations 3 through 6. Referring to operations 1 and 2, $P_1$ and $P_0$ are not identical and accordingly, equations 3 and 5 will be applied to the addition ($P_1+P_0$).

Figure 3:
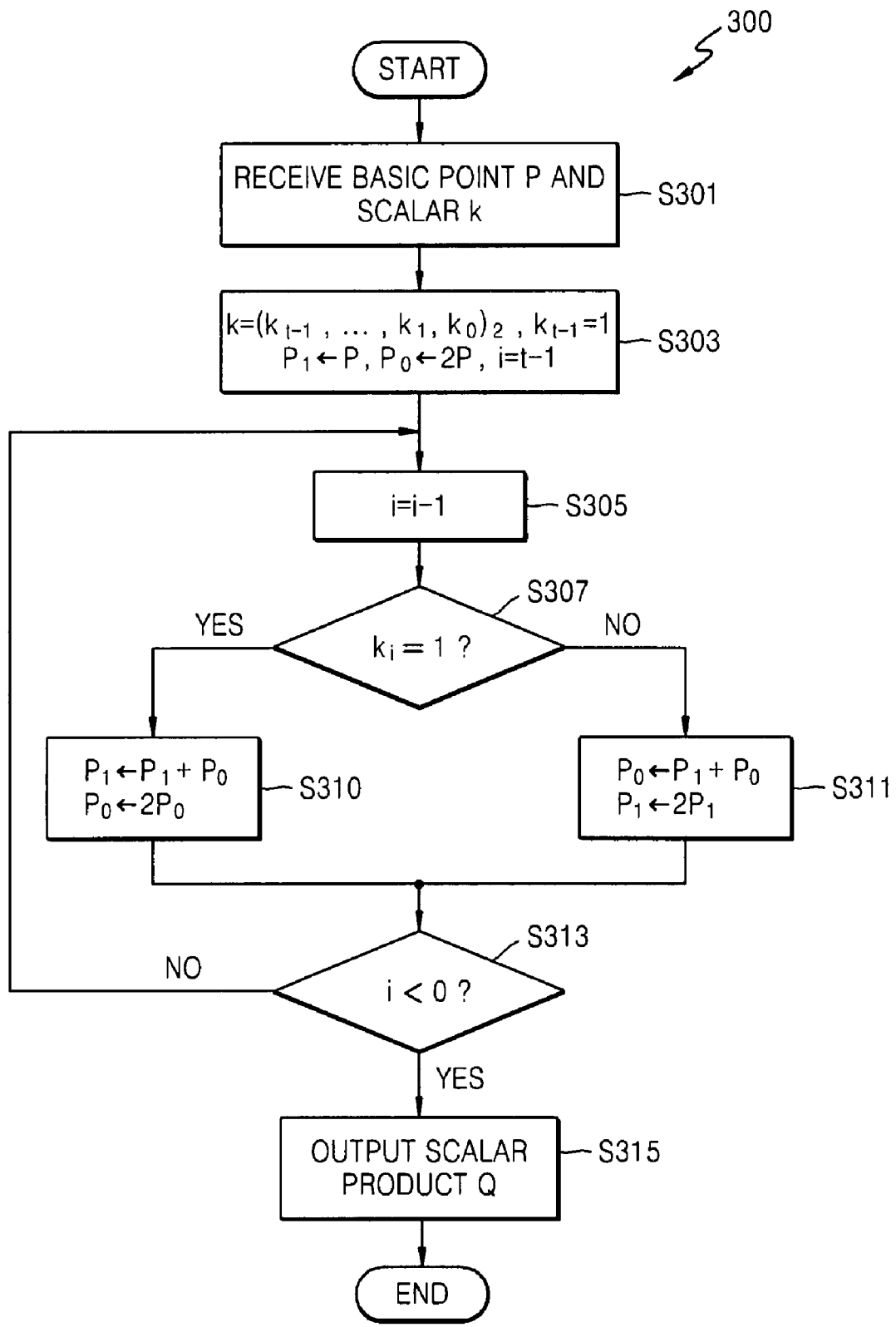
FIG. 3 is a flowchart illustrating a cryptographic method of performing a scalar product operation using a Montgomery algorithm, according to an example embodiment.

FIG. 3 is a flowchart illustrating a cryptographic method of performing a scalar product operation using an MPLA, according to an example embodiment. In the cryptographic method 300, basic point P and scalar k are received in operation S301. Variables to repeat scalar multiplication are set in operation S303.

That is, first variable $P_1$ is set as basic point P, second variable $P_0$ is set as twice the basic point P (e.g., 2P), and repetitive parameter i is initialized as t−1.

In operation S303, scalar k may be expressed as binary bit $(k_{t-1}, \ldots, k_1, k_0)_2$, and t are integers, and $k_{t-1}$ is 1.

Subsequent to setting variables, scalar product Q=kP may be calculated by repetitive operations. That is, by iterating from i to 0 using operation S305, first and second variables $P_1$ and $P_0$ are reset in operations S310 and S311 with respect to each binary bit $k_i$ in operation S307. The process repeats, and if i is less than 0 in operation S313, the first variable $P_1$ is output as scalar product Q=kP in operation S315.

However, in the general MPLA, because an addition operation and a doubling operation are performed in each iteration, a degradation in performance may occur. In order to prevent this degradation, a fast MPLA method has been suggested where a loop calculation excluding calculations in the form of a Y coordinate is performed, and the Y coordinate is redefined.

A fast MPLA in a prime field will now be explained. Equations in relation to doubling operations and additions are defined as the following equation 10:

$$\begin{cases} X_{P'} = 2(X_P Z_Q + X_Q Z_P)(X_P X_Q + u Z_P Z_Q) + \\ \quad 4bZ_P^2 Z_Q^2 - x_D(X_P Z_Q - X_Q Z_P)^2 \\ Z_{P'} = (X_P Z_Q - X_Q Z_P)^2 \\ X_{Q'} = (X_Q^2 - aZ_Q^2)^2 - 8bX_Q Z_Q^3 \\ Z_{Q'} = 4(X_Q Z_Q(X_Q^2 + aZ_Q^2) + bZ_Q^4), \end{cases} \quad \text{(equation 10)}$$

Referring to equation 10, it may be seen that Y coordinates are not included in the equations. A parallel operation process of fast MPLA using 8 registers (R0 through R7) are shown in the following Table 1:

TABLE 1

Input: $(X_P,Z_P,X_Q,Z_Q)$
Output: $(X_{P'},Z_{P'},X_{Q'},Z_{Q'})$
R0←$X_P$, R1←$Z_P$, R2←$X_Q$, R3←$Z_Q$

| | | | |
|---|---|---|---|
| R6←R2 · R1 | (1) | R7←R3 · R0 | (2) |
| R4←R7 + R6 | (3) | R5←R7 − R6 | (4) |
| R5←R5 · R5 | (5) | R7←R1 · R3 | (6) |
| R1←a · R7 | (7) | R6←R7 · R7 | (8) |
| R0←R0 · R2 | (9) | R6←b · R6 | (10) |
| R0←R0 + R1 | (11) | R6←R6 + R6 | (12) |
| R0←R0 · R4 | (13) | R1←$x_D$· R5 | (14) |
| R4←R0 + R6 | (15) | | |
| R4←R4 + R4 | (16) | R6←R2 + R2 | (17) |
| R4←R4 − R1 | (18) | R7←R3 + R3 | (19) |
| R0←R6 · R7 | (20) | R1←R3 · R3 | (21) |
| R2←R2 · R2 | (22) | R3←a · R1 | (23) |
| R6←R2 − R3 | (24) | R7←R2 + R3 | (25) |
| R1←R1 + R1 | (26) | | |
| R2←b · R1 | (27) | R7←R7 · R0 | (28) |
| R1←R2 · R1 | (29) | R0←R0 · R2 | (30) |

TABLE 1-continued

```
R6 ← R6 · R6       (31) |
R6 ← R6 - R0       (32) | R7 ← R7 + R1    (33)
X_P ← R4, Z_P ← R5, X_Q ← R6, Z_Q ← R7
```

Referring to Table 1, 19 multiplications and 14 additions (or subtractions) are included. Subsequent to performing the calculations, the result of the calculations is transformed into a point expression. An X coordinate may be expressed as a simple finite filed multiplication, as in the following equation 11:

$$x = X_P \cdot Z_P \quad \text{(equation 11)}$$

However, in relation to the Y coordinate, is the Y coordinate may be expressed as a more complex expression, e.g., 10 finite field products as in the following equation 12:

$$y_k = \frac{2bZ_k^2 Z_{k+1} + Z_{k+1}(x_P X_k + aZ_k)(X_k + x_P Z_k) - X_{k+1}(X_k - x_P Z_k)^2}{(2y_P Z_k^2 Z_{k+1})} \quad \text{(equation 12)}$$

However, the calculation in relation to the Y coordinate may only be performed once if one scalar product is executed, as an additional cost may be ignored.

A fast MPLA in a binary field will now be explained. To perform an MPLA scalar product calculation without including a Y coordinate, a minor modification to the calculation process in the fast MPLA in a binary field is made in a manner similar to that of the fast MPLA in the prime field. According to the modification, several finite field multiplications are reduced, and as a result, improved performance may be achieved.

As an example of a fast MPLA in a binary field, Lopez-Dahab Montgomery Scalar Product Algorithm is shown in the following Algorithm (2):

---
Algorithm (2) Lopez-Dahab Algorithm
---
Input : k = $(k_{t-1},...,k_1,k_0)_2$ with $k_{t-1}$= 1, P(x,y) ∈ GF(2^m)
Output : kP($x_3,y_3$)
1. $X_1$ ← x, $Z_1$ ← 1, $X_2$ ← $x^4$ + b, $Z_2$ ← $x^2$.  {Compute(P,2P)}
2. for i = n - 2 to 0 , do
   2.1 if $k_i$ = 1 then
       T ← $Z_1, Z_1$ ← $(X_1 Z_2 + X_2 Z_1)^2$, $X_1$ ← $xZ_1 + X_1 X_2 TZ_2$
       T ← $X_2, X_2$ ← $X_2^4 + bZ_2^4, Z_2$ ← $T^2 Z_2^2$
   2.2 else
       T ← $Z_2, Z_2$ ← $(X_1 Z_2 + X_2 Z_1)^2$, $X_2$ ← $xZ_2 + X_1 X_2 Z_1 T$
       T ← $X_1, X_1$ ← $X_1^4 + bZ_1^4, Z_1$ ← $T^2 Z_1^2$
end for;
3. $x_3$ ← $X_1 / Z_1$
4. $y_3$ ← $(x + X_1 / Z_1)[(X_1 + xZ_1)(X_2 + xZ_2) + (x^2 + y)(Z_1 Z_2)](xZ_1 Z_2)^{-1}$ + y
5. return kP($x_3,y_3$)

A person having ordinary skill in the art of example embodiments may calculate a scalar product (Q=kP) using the fast MPLA of Algorithm (2).

Example embodiments may use basic characteristics of an ordinary MPLA.

If the relationship between two variables $L_j$ and $H_j$ shown in equation 7 is considered, and if a predetermined or given fault has not flowed in an operation performed in the cryptographic system, the difference between the two variables $L_j$ and $H_j$ may always be 1. This may be similar to the difference between arbitrary variables $P_1$ and $P_2$ applied to an ordinary MPLA as always being P.

The probability that the difference between two arbitrary variables $P_1$ and $P_2$ is P even though 2 random faults have flowed in, that is, a result the same as if a fault has not flowed in, is almost zero. Because this is understood as an obvious fact to a person having ordinary skill in the art of example embodiments, this case is not considered.

Accordingly, if arbitrary variables $P_1$, $P_2$, and P applied to an ordinary MPLA satisfy any one of the following three expressions (labeled equation 13), it may be determined that no fault has flowed in. The expressions of equation 13 express an identical condition differently:

$$P_2 - P_1 = P? \ P_2 - P = P_1? \ P_1 + P = P_2? \quad \text{(equation 13)}$$

However, this determination method may have a drawback in that it may not be applied to a fast MPLA (FMPLA) efficiently because a Y coordinate does not exist if a main loop is calculated. Coordinates may be transformed, or another similar method may be applied to the fast MPLA, but these methods may substantially increase costs. Accordingly, in order to perform the determination operation, another method may be used.

The determination method in a fast MPLA used in example embodiments will now be explained. In order to perform the determination method used in example embodiments, a new mathematical expression labeled equation 14 may be used:

$$H_j = 2L_{j+1} + k_j + 1 = L_{j+1} + H_{j+1} + k_j = 2H_{j+1} + k_j - 1 \quad \text{(equation 14)}$$

A person having ordinary skill in the art of example embodiments may derive equation 14 using the basic characteristics of MPLA. Equation 14 may provide that a new determination as the following expressions (labeled equation 15) may be performed:

$$H_j = L_j + 1 \quad \text{(equation 15)}$$
$$2H_{j+1} = H_j + 1 \big|_{if \ (k_j=0)}$$

To confirm that no fault exists in the previous calculation, $H_j$ and $L_j$ values should be included in the calculation while the determination is performed.

A Montgomery method of calculating the sum of two points $H_j$ and $L_j$ at X coordinates, excluding Y coordinates, may be based on information of the difference of these two points $H_j$ and $L_j$.

The characteristic may be used to derive a fault check operation. In addition, in order to satisfy an indistinguishability operation balance by a power track analysis, two cases of $k_j=0$ and $k_j=1$ should be considered.

First, if $k_j=1$, a fault check operation may be performed according to the following:

1. $L_j - 1$ is calculated through a doubling operation using equation 16:

$$L_j - 1 = 2L_{j+1} + k_j - 1 \big|_{if \ (k_j=1)} = 2L_{j+1} \quad \text{(equation 16)}$$

2. Considering the result using equation 1, $L_j+1$ is calculated with an addition.
3. Whether or not $L_j+1=H_j$ is checked. Here, $H_j$ is a value previously calculated.

Next, if $k_j=0$, a fault check operation is performed according to the following:

1. $2H_{j+1}$ is calculated with a doubling operation using equation 17:

$$H_j + 1 = 2H_{j+1} + k_j - 1 + 1 \mid_{if(k_j=0)} = 2H_{j+1} \qquad \text{(equation 17)}$$

2. Considering $L_j$, $H_j+1$ is calculated with an addition.
3. Whether or not $H_j+1=2H_{j+1}$ is checked. Here, $2H_{j+1}$ is a value previously calculated.

As described above, $H_j$ and $L_j$ may be included in checking processes of both cases. More clearly, whether or not a fault exists is checked at both of the calculated two points. In order to more easily implement a DFA prevention method, a series of additions and doubling operations in the main loop of a fast MPLA are changed into a doubling operation and an addition.

In an example embodiment, a method of checking whether or not a fault has flowed in by a fast MPLA using new mathematical equations is suggested. By doing so, an algorithm that can be applied to a variety of types of cryptographic system without lowering the performance of the system, even in a fast MPLA, is suggested.

A variety of embodiments with respect to a position to which a new checking method is applied will now be suggested. That is, a regular check and a random check, in which whether or not a fault has flowed in is determined if a scalar multiplication is performed, and an at-the-end check method in which whether or not a fault has flowed in is determined after a scalar multiplication is finished and before the result of the operation is output, will be explained.

For example, in the regular check method, whether or not a fault has flowed in may be checked if a scalar multiplication operation is performed. In the random check method, whether or not a fault has flowed in is checked only if a scalar multiplication operation that is randomly selected is performed.

Figure 4:
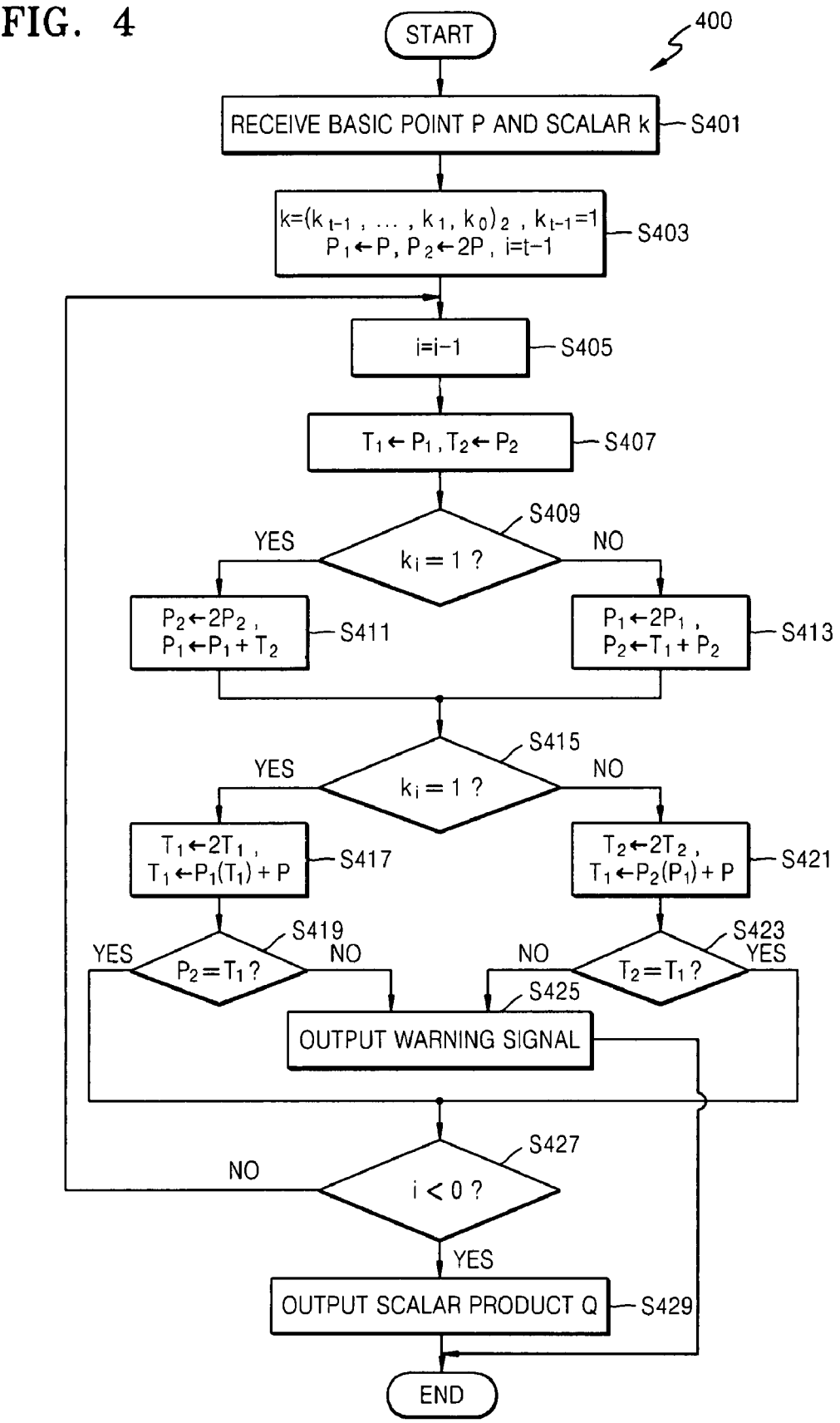
FIG. 4 is a flowchart illustrating a cryptographic method, according to an example embodiment.

FIG. 4 is a flowchart illustrating a cryptographic method according to an example embodiment, in which the regular check method is applied. In the cryptographic method 400, a checking operation is performed in each repetitive interval in which a scalar multiplication is performed. The following Algorithm (3) is for a cryptographic method using a fast MPLA to which the regular check method is applied:

---

Algorithm (3) fast MPLA using regular check method

Input : $k = (k_{t-1},...,k_1,k_0)_2$ with $(k_{t-1}= 1, P(x,y)$
Output : $P_1 = kP(x_3,y_3)$
1. $P_1 \leftarrow P$
2. $P_2 \leftarrow 2P$
3. for $i = n - 2$ to 0, do
   3.1 $T_1 \leftarrow P_1; T_2 \leftarrow P_2$
   3.2 if $k_i = 1$ then
      $P_2 \leftarrow 2P_2; P_1 \leftarrow P_1 + T_2$
   3.3 else
      $P_1 \leftarrow 2P_1; P_2 \leftarrow T_1 + P_2$
   3.4 if $k_i = 1$ then
      $T_1 \leftarrow 2T_1; T_1 \leftarrow P_1(T_1) + P$
   3.5   if $P_2 \neq T_1$ then STOP or Fault diffusion
   3.6 else
      $T_2 \leftarrow 2T_2; T_1 \leftarrow P_2(P_1) + P$
   3.7   if $T_2 \neq T_1$ then STOP or Fault diffusion
   end for;
4. return $P_1 = kP(x_3,y_3)$

---

Hereinafter, the cryptographic method 400 using an MPLA to which the regular check method is applied will be explained with reference to FIG. 4. In the cryptographic method 400, a basic point P and a scalar k are received in operation S401 and a scalar product $Q(P_1)(=kP)$ is output in operation S429.

Here, the basic point P is a point on a predetermined or desired elliptic curve, and is stored in memory if the method is implemented in hardware. For example, the memory may be embodied as EEPROM or any suitable memory device(s). The scalar k may be expressed as binary bits $(k_{t-1}, \ldots, k_1, k_0)_2$, and may be used as a secret key in an actual cryptographic system. In at least one example embodiment, $k_{t-1}$ is 1.

In the cryptographic method 400, subsequent to receipt of the basic point P and scalar k in operation S401, parameters or variables for encryption are initialized or set in operation S403. In order to perform repetitive operations with respect to binary bit $k_i$ of the scalar k, variables are used in example embodiments. In example embodiments, variables are initialized or set according to a predetermined or desired rule and/or rule set in operations S403 or S407.

By using the basic point P, a first primary variable $P_1$ and a second primary variable $P_2$ may be initialized. For example, the first primary variable $P_1$ is initialized as the basic point P and the second primary variable $P_2$ is initialized as twice the basic point P (operations 1 and 2 of algorithm (3); operation S403).

Subsequent to initialization of parameters and/or variables used in the cryptographic method 400, repetitive operations are performed to calculate a scalar product Q in operations S405 through S413, and S427. To perform repetitive operations in relation to all bits of the scalar k expressed as binary bits, if repetitive operation variable i is decreased to 0 in operation S405, the repetitive operations in relation to binary bit $k_i$ may be performed in example embodiments. The repetitive operations according to example embodiments will now be explained in more detail.

If a repetitive operation is performed, the repetitive operation variable i is decreased by 1 in operation S405, and a first secondary variable $T_1$ and a second secondary variable $T_2$ are set. The first secondary variable $T_1$ and the second secondary variable $T_2$ may be used in repetitive operations S405 through S413 and check operations S415 through S425 subsequent to the repetitive operations. Referring to equations 14 through 17, the first secondary variable $T_1$ is set as a first primary variable $P_1$ in operation S407. Additionally, the second secondary variable $T_2$ is set as a second primary variable $P_2$ in operation S407.

Subsequent to setting the variables in response to scalar k (e.g., binary bit $k_i$ of the scalar k), the first primary variable $P_1$ and the second primary variable $P_2$ are reset such that repetitive scalar multiplication operations are performed.

For example, if binary bit $k_i$ is 1, a value obtained by doubling the second primary variable $P_2$ is reset as a second primary variable $P_2$. Additionally, if binary bit $k_i$ is 1, the sum of the first primary variable $P_1$ and the second secondary variable $T_2$ is reset as a first primary variable $P_1$ in operation S411. If the binary bit $k_i$ is not 1, a value obtained by doubling the first primary variable $P_1$ is reset as a first primary variable $P_1$. Additionally, if the binary bit $k_i$ is not 1, the sum of the first secondary variable $T_1$ and the second primary variable $P_2$ is reset as a second primary variable $P_2$ in operation S413.

The operations for resetting are repeatedly performed until the repetitive operation variable i is 0, and if the repetitive operation variable i is less than 0, P1 becomes scalar product Q.

Because whether or not a fault has flowed in is checked if the operation for resetting is finished in the cryptographic method 400 of FIG. 4, the checking operation is regularly performed. The operations S415 through S423 for checking whether or not a fault has flowed in will now be explained.

As described above with reference to equations 14 through 17, in an example embodiment, whether or not a fault has flowed in may be checked in response to binary bit $k_i$. Accordingly, whether or not the binary bit $k_i$ is 1 is determined in operation S415.

If the binary bit $k_i$ is 1, a value obtained by doubling the first secondary variable $T_1$ is reset as a first secondary variable $T_1$ in operation S417. Additionally, if the binary bit $k_i$ is 1, the sum of the first primary variable $P_1$ determined in response to the first secondary variable $T_1$ and the basic point P is reset as a first secondary variable $T_1$ in operation S417. Subsequently, whether or not the secondary primary variable $P_2$ and the reset first secondary variable $T_1$ are identical is examined. If the variables $P_2$ and $T_1$ are identical, it is determined that no fault has occurred (operation S419). If the variables $P_2$ and $T_1$ are not identical, it is determined that a fault has occurred (operation S419).

If the binary bit $k_i$ is not 1, a value obtained by doubling the second secondary variable $T_2$ is reset as a second secondary variable $T_2$ in operation S421. Additionally, if the binary bit $k_i$ is not 1, the sum of the second primary variable $P_2$ determined in response to the first primary variable $P_1$ and the basic point P is reset as a first secondary variable $T_1$ in operation S421. Subsequently, whether or not the reset second secondary variable $T_2$ and the reset first secondary variable $T_1$ are identical is examined. If the variables $T_2$ and $T_1$ are identical, it is determined that no fault has occurred (operation S423). If the variables $T_2$ and $T_1$ are not identical, it is determined that a fault has occurred (operation S423).

In the cryptographic method 400, if it is determined that no fault has flowed in, operation S427 determines whether or not the repetitive parameter i is less than 0. If the repetitive parameter i is not less than 0, scalar multiplication operations and operations for checking whether or not a fault has flowed in are repeatedly performed, and the repetitive parameter i is decreased. However, if the repetitive parameter i is less than 0, the $P_1$ value is output as scalar product Q in operation S429.

If it is determined in the cryptographic method 400 that a fault has flowed in, a warning signal may be output. In example embodiments, other useful operations may be further performed in addition to outputting the warning signal, and will be explained later.

Figure 5:
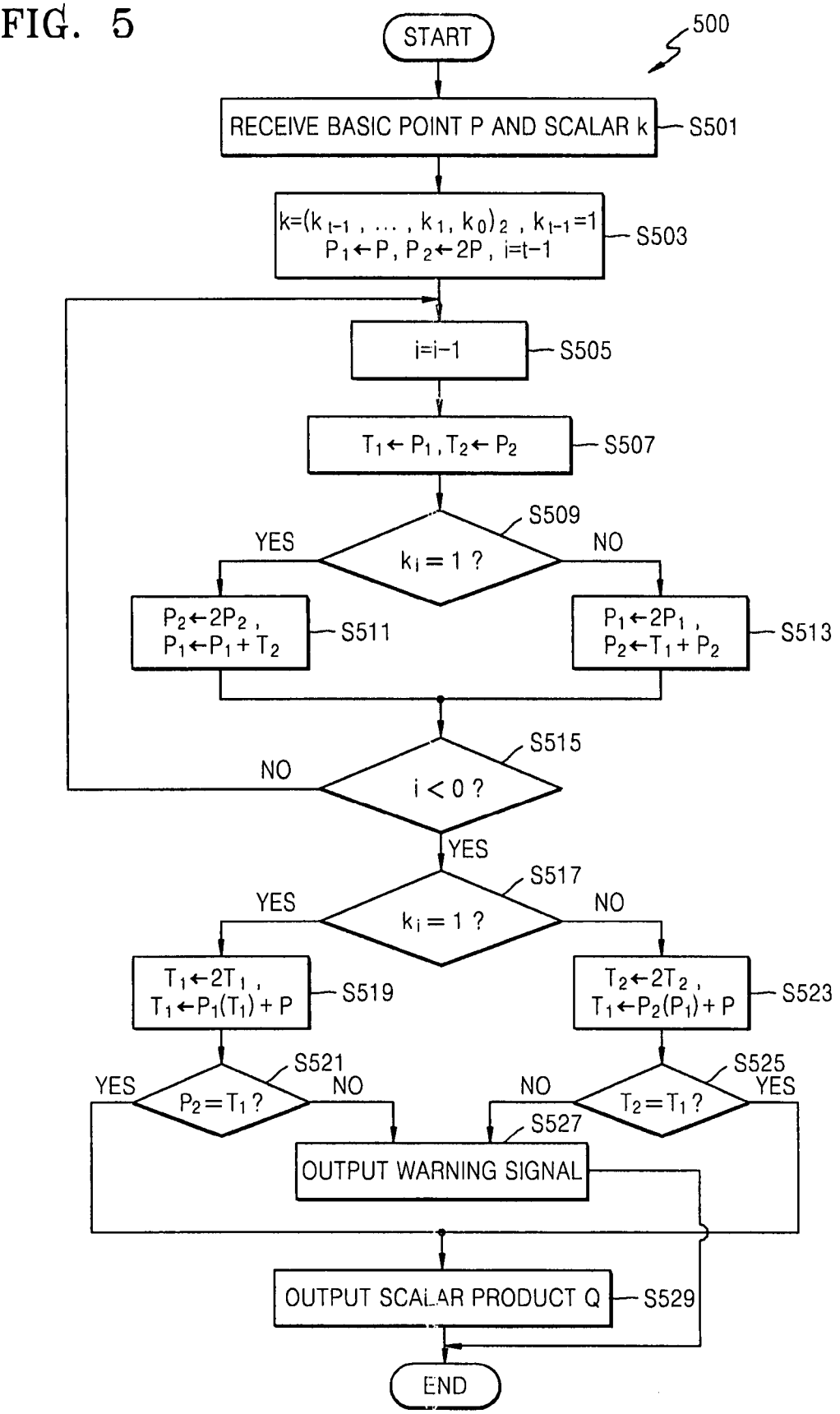
FIG. 5 is a flowchart illustrating a cryptographic method, according to an example embodiment.

FIG. 5 is a flowchart illustrating a cryptographic method according to example embodiment, in which the at-the-end check method is applied. In the cryptographic method 500, a checking operation may be performed after a scalar multiplication is finished. The following algorithm (Algorithm (4)) may be applied to a cryptographic method using a fast MPLA such that the at-the-end check method is applied:

| Algorithm (4) fast MPLA using at-the-end check method |
|---|
| Input : $k = (k_{t-1},...,k_1,k_0)_2$ with $k_{t-1} = 1$, P(x,y) |
| Output : $P_1 = kP(x_3,y_3)$ |
| 1. $P_1 \leftarrow P$ |
| 2. $P_2 \leftarrow 2P$ |
| 3. for i = n − 2 to 0 , do |
|     3.1 $T_1 \leftarrow P_1$; $T_2 \leftarrow P_2$ |
|     3.2 if $k_i = 1$ then |
|         $P_2 \leftarrow 2P_2$; $P_1 \leftarrow P_1 + T_2$ |
|     3.3 else |
|         $P_1 \leftarrow 2P_1$; $P_2 \leftarrow T_1 + P_2$ |
| end for; |
| 4. if $k_i = 1$ then |
|     $T_1 \leftarrow 2T_1$; $T_1 \leftarrow P_1(T_1) + P$ |
|     4.1    if $P_2 \neq T_1$ then STOP or Fault diffusion |
| else |
|         $T_2 \leftarrow 2T_2$; $T_1 \leftarrow P_2(P_1) + P$ |
|     4.2    if $T_2 \neq T_1$ then STOP or Fault diffusion |
| 5. return $P_1 = kP(x_3,y_3)$ |

The cryptographic method 500 using an MPLA to which the at-the-end check method is applied will now be explained with reference to FIG. 5. In the cryptographic method 500, whether or not a fault has flowed in is examined after iterations for scalar multiplication are finished.

That is, in response to binary bit $k_1$, a first primary variable and a second primary variable are reset in operations S511 and S513. Instead of immediately checking whether or not a fault has flowed in, it is determined whether repetitive parameter i is less than 0 in operation S515, thus determining whether to iterate for scalar multiplication. Subsequently, it is examined whether or not a fault has flowed in. Because other operations of FIG. 5 are the same as or substantially similar to those of FIG. 4, specific and detailed explanations will be omitted herein for the sake of brevity.

Figure 6:
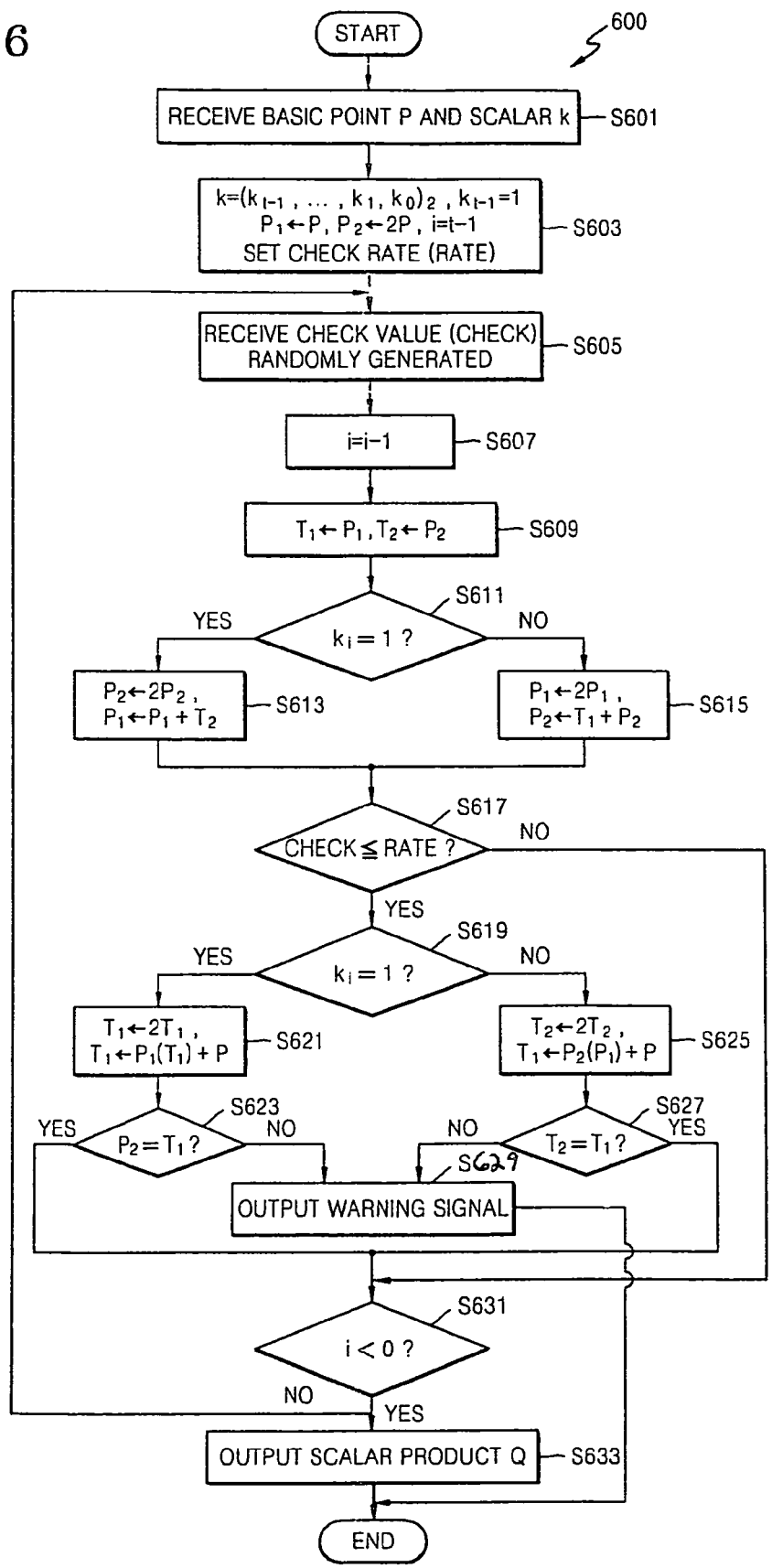
FIG. 6 is a flowchart illustrating a cryptographic method, according to an example embodiment.

FIG. 6 is a flowchart illustrating a cryptographic method according to an example embodiment in which the random check method is applied.

In the cryptographic method 600, a checking operation is performed in a repetitive operation of a randomly selected scalar multiplication. The following algorithm (Algorithm (5)) is for a cryptographic method using a fast MPLA to which the random check method is applied:

| Algorithm (5) fast MPLA using random check method |
|---|
| Input : $k = (k_{t-1},...,k_1,k_0)_2$ with $k_{t-1} = 1$, P(x,y) |
| Output : $P_1 = kP(x_3,y_3)$ |
| 1. $P_1 \leftarrow P$ |
| 2. $P_2 \leftarrow 2P$ |
| 3. for i = n − 2 to 0 , do |
|     3.1 $T_1 \leftarrow P_1$; $T_2 \leftarrow P_2$ |
|     3.2 if $k_i = 1$ then |
|         $P_2 \leftarrow 2P_2$; $P_1 \leftarrow P_1 + T_2$ |
|     3.3 else |
|         $P_1 \leftarrow 2P_1$; $P_2 \leftarrow T_1 + P_2$ |
|     3.4 check ← random(0,1) |
|     3.5 if check = 1 then |
|         3.5 if $k_i = 1$ then |
|             $T_1 \leftarrow 2T_1$; $T_1 \leftarrow P_1(T_1) + P$ |
|     3.6    if $P_2 \neq T_1$ then STOP or Fault diffusion |
|     3.7 else |
|         $T_2 \leftarrow 2T_2$; $T_1 \leftarrow P_2(P_1) + P$ |
|     3.8    if $T_2 \neq T_1$ then STOP or Fault diffusion |
| end for; |
| 4. return $P_1 = kP(x_3,y_3)$ |

The cryptographic method 600 using an MPLA with the random check method applied will now be explained with reference to FIG. 6. In the cryptographic method 600, whether or not a fault has flowed in is examined after an arbitrary scalar multiplication operation is performed during scalar multiplication operation iterations.

That is, in response to binary bit $k_1$, a first primary variable and a second primary variable are reset in operations S613 and S615. Subsequently, it is determined whether or not to check if a fault has flowed in. That is, it is determined whether or not a predetermined or desired check value CHECK is less than or equal to a check rate RATE in operation S617. If the check value CHECK is less than or equal to the check rate RATE, it is checked if a fault has occurred.

In at least one example embodiment, the check rate RATE is a value to determine the frequency of operations for checking for fault occurrences (e.g., whether or not a fault has flowed in).

Referring to FIG. 6, in an operation where parameters used in the cryptographic method are initialized or set, the check rate RATE may be set in operation S603. The check value CHECK may be a randomly generated value.

For example, both the check value CHECK and the check rate RATE may be a value from 0 to 100. If the check rate RATE is set as 70, and the check value CHECK is less than or equal to 70, fault occurrences are checked (i.e, it is checked whether or not a fault has flowed in). If the check value CHECK is greater than 70, fault occurrences are not checked.

In an example embodiment, both the check value CHECK and the check rate RATE may be randomly determined binary values (0 or 1). For example, if the check value CHECK and the check rate RATE have identical values (or alternatively, different values), fault occurrences may be checked. If the check value CHECK and the check rate RATE have different values (or alternatively, identical values), fault occurrences may not be checked. The opposite may be true as well, depending upon implementation.

A person having ordinary skill in the art may apply a variety of random examination methods in addition to the methods described herein, and may understand that the operations for receiving the check value CHECK and setting the check rate RATE may be performed at other portions of the methodology. Because other operations of FIG. 6 are also the same as or substantially similar to those of FIG. 4, specific and detailed explanation will be omitted herein for the sake of brevity.

As described above, if it is determined that a fault has flowed in, a warning signal is output in operations S425, S527, and S629. Subsequent to the warning signal output, a variety of operations may be performed. For example:
1. An operation being executed is stopped and values of registers used in the operation are set or reset and an output is set to 0.
2. After applying fault diffusion for a secret key value, operations are performed continuously (Please see Korean Patent Application No. 2005-0022929 filed with the KIPO), the entire disclosure of which is incorporated herein by reference).
3. An output point is modified and then used (Please see Korean Patent Application No. 2005-0018429 filed with the KIPO), the entire disclosure of which is incorporated herein by reference).

Because the cryptographic method using a fast MPLA to which the regular check method illustrated in FIG. 4 is applied may respond immediately or almost immediately after a fault has occurred, the method is suitable for a cryptographic system having a higher or relatively high secret level. Though the performance of the cryptographic system may be lowered, the performance is still better compared to that of the compute-twice-and-check approach illustrated in FIG. 1.

The cryptographic method using a fast MPLA to which the at-the-end check method is applied illustrated in FIG. 5 may reduce performance lowering issues of the conventional art.

The cryptographic method using a fast MPLA to which the random check method is applied illustrated in FIG. 6 has somewhat similar advantages to that of the regular check method at the same time, performance lowering issues are less than that of the regular check method.

A good advantage of the fast MPLA used in example embodiments is that the method may actively counter a DFA and at the same time, counter an attack using power analysis, and fast MPLA may enable fast operations.

FIGS. 4 through 6 illustrate example embodiments of MPLA. The applications of the example embodiments are explained in relation to scalar multiplication operations applied to ECC.

However, if FIGS. 4 through 6, the explanations on the figures, and the relationship between scalar multiplication operations in the ECC and modular exponential operations in the RSA are considered, a person having ordinary skill in the art of example embodiments may modify the MPLA such that the MPLA may be used in the modular exponential operations of RSA.

Example embodiments may also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (for example, data transmission through the Internet). The computer readable recording medium can also be distributed over network coupled computer systems so that the computer readable code is stored and executed in a distributed fashion.

Example embodiments may also be implemented in or as software, for example, as any suitable computer program. For example, a program in accordance with one or more example embodiments may be a computer program causing a computer to execute one or more of the example methods described herein: a method cryptography using MPLA. A computer program product may include the computer program.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, for example, RAMs, ROMs, flash memories, and hard disks. Examples of a removable medium may include, but are not limited to, optical storage media, for example, CD-ROMs and DVDs; magneto-optical storage media, for example, MOs; magnetism storage media, for example, floppy disks (trademark), cassette tapes, and removable hard disks; media with a built-in rewriteable non-volatile memory, for example, memory cards; and media with a built-in ROM, for example, ROM cassettes.

These programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer, where instructions or functions may be executed as ECC and/or cryptographic software and/or cryptographic algorithms directly on a host processor, in accordance with example embodiments.

Also, such programs, when recorded on computer-readable storage media, may be readily stored and distributed. The storage medium, as it is read by a computer, may enable cryptographic operations directly on a host processor, in accordance with the example embodiments.

Furthermore, while example embodiments have been particularly shown and described, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

As described above, the cryptographic method according to example embodiments may be applied to a variety cryptographic systems without degrading the performance of the cryptographic systems and counter a variety of attacks using faults.

What is claimed is:

1. A cryptographic method for a cryptographic system, the method comprising:
   receiving a basic point P on an elliptic curve and a scalar k;
   initializing a plurality of primary variables with the basic point P;
   iterating through a plurality of operations using a repetitive operation variable i, where i is an integer;
   wherein the plurality of operations includes:
      setting a plurality of secondary variables corresponding to the plurality of primary variables;
      resetting the plurality of primary variables and secondary variables based on a portion of the scalar k; and
      calculating, in a multiplier of the cryptographic system, a scalar product Q equal to a product of the basic point P and the scalar k;
   identifying a fault, in one or more of setting the plurality of secondary variables, resetting the plurality of primary variables and secondary variables, and calculating the scalar product Q, the identifying of the fault using the plurality of primary variables and secondary variables based on the portion of the scalar k, the fault identified by one of determining that values of at least two of the secondary variables are different and determining that at least one of the secondary variables is different from at least one of the primary variables; and
   outputting the scalar product Q if there is no fault identified;
   wherein initializing the plurality of primary variables includes:
      initializing a first primary variable $P_1$ of the plurality of primary variables as the basic point P;
      initializing a second primary variable $P_2$ of the plurality of primary variables as twice the basic point P;
      initializing the repetitive operation variable i as a value t-1, where t is an integer; and
      expressing the scalar k as binary bits $(k_{t-1}, \ldots, k_1, k_0)_2$, where $k_{t-1}$ is 1; and
   wherein the plurality of secondary variables includes a first secondary variable $T_1$ and a second secondary variable $T_2$, and identifying the fault includes:
      if the binary bit $k_i$ is 1,
         resetting the first secondary variable $T_1$ as double the first secondary variable $T_1$,
         resetting the first secondary variable $T_1$ as a sum of the first primary variable $P_1$, determined in response to the first secondary variable $T_1$, and the basic point P,
         identifying that no fault has occurred if the second primary variable $P_2$ and the reset first secondary variable $T_1$ are identical, and
         identifying that a fault has occurred if the second primary variable $P_2$ and the reset first secondary variable $T_1$ are not identical; and
      if the binary bit $k_i$ is not 1,
         resetting the second secondary variable $T_2$ as double the second secondary variable $T_2$,
         resetting the first secondary variable $T_1$ as a sum of the second primary variable $P_2$, determined in response to the first secondary variable $T_1$, and the basic point P,
         identifying that no fault has occurred if the reset second secondary variable $T_2$ and the reset first secondary variable $T_1$ are identical, and
         identifying that a fault has occurred if the reset second secondary variable $T_2$ and the reset first secondary variable $T_1$ are not identical.

2. The method of claim 1, wherein resetting the plurality of primary variables and secondary variables is based on a binary value of the portion of the scalar k.

3. The method of claim 1, wherein identifying the fault is based on a binary value of the portion of the scalar k.

4. The method of claim 1, wherein outputting the scalar product Q includes outputting the first primary variable $P_1$ as the scalar product Q.

5. The method of claim 1, wherein calculating the scalar product Q includes:
   setting the first secondary variable $T_1$ of the plurality of secondary variables as the first primary variable $P_1$;
   setting the second secondary variable $T_2$ of the plurality of secondary variables as the second primary variable $P_2$;
   decreasing the repetitive operation variable i until the repetitive operation variable i is less than 0; and
   resetting the first primary variable $P_1$ and the second primary variable $P_2$ to values based on a value of the binary bit $k_1$.

6. The method of claim 5, wherein in resetting the plurality of primary variables:
   if the binary bit $k_1$ is 1,
      the second primary variable $P_2$ is reset as double the second primary variable $P_2$, and
      the first primary variable $P_1$ is reset as a sum of the first primary variable $P_1$ and the second secondary variable $T_2$; and
   if the binary bit $k_i$ is not 1,
      the first primary variable $P_1$ is reset as double the first primary variable $P_1$, and
      the second secondary variable $P_2$ is reset as a sum of the first secondary variable $T_1$ and the second primary variable $P_2$.

7. The method of claim 1, wherein the plurality of operations further includes identifying the fault.

8. The method of claim 1, wherein identifying the fault is performed subsequent to iterating through the plurality of operations.

9. The method of claim 1, wherein resetting the plurality of primary variables and secondary variables includes identifying the fault.

10. The method of claim 1, wherein initializing the plurality of primary variables includes setting a check rate;

wherein calculating, in the multiplier of the cryptographic system, the scalar product Q includes receiving a randomly generated check value; and wherein if the check value is less than or equal to the check rate, resetting the plurality of primary variables further includes identifying the fault.

11. The method of claim 1, further comprising outputting an alarm signal if a fault is identified.

12. The method of claim 11, wherein outputting the alarm signal includes:

stopping an operation related to the cryptographic method and resetting registers in which the operation is executed;

diffusing the fault in relation to the scalar k; and modifying the scalar product Q.

13. A non-transitory computer readable medium including program segments for, when executed on a computer device, causing the computer device to implement the method of claim 1.

14. A computer device comprising the non-transitory computer readable medium of claim 13, the non-transitory computer readable medium having computer program logic or code portions embodied thereon.

15. A non-transitory computer readable medium including program segments for, when executed on a cryptographic apparatus, causing the cryptographic apparatus to implement the method of claim 1.

16. A cryptographic apparatus comprising the non-transitory computer readable medium of claim 15, the non-transitory computer readable medium having computer program logic or code portions embodied thereon.

* * * * *